United States Patent [19]
Witzmann et al.

[11] Patent Number: 6,055,829
[45] Date of Patent: May 2, 2000

[54] PROCESS FOR PRODUCING A DESIRED BREAKING POINT ON A GLASS BODY

[75] Inventors: Andre Witzmann, Waldershof; Ulls Trinks, Mitterteich, both of Germany

[73] Assignee: Schott Glas, Mainz, Germany

[21] Appl. No.: 09/110,892

[22] Filed: Jul. 7, 1998

[30] Foreign Application Priority Data

Jul. 7, 1997 [DE] Germany .......................... 197 28 766

[51] Int. Cl.[7] .................................................. C03B 23/00
[52] U.S. Cl. ..................... 65/105; 65/56; 65/97; 65/112; 216/65; 216/80; 219/121.72
[58] Field of Search .................... 65/56, 61, 97, 65/105, 112, DIG. 3; 216/65, 80; 219/121.72; 206/528, 532; 53/284.6

[56] References Cited

FOREIGN PATENT DOCUMENTS

| 743128 | 11/1996 | European Pat. Off. . |
| 35 37 434 A1 | 4/1987 | Germany . |
| 4214159 | 11/1993 | Germany . |
| 4300730 | 3/1994 | Germany . |
| 4407547 | 9/1995 | Germany . |

OTHER PUBLICATIONS

Callister, Jr., William, Materials Science and Engineering, pp. 214–218, 1991.

Primary Examiner—Stanley S. Silverman
Assistant Examiner—Michael P. Colaianni
Attorney, Agent, or Firm—Millen, White, Zelano & Branigan

[57] ABSTRACT

A process is described for producing a desired breaking point for breaking the glass wall of a glass body, in particular a break-open ampule or a tube, or for separating parts out of a pane of glass by generating microcracks in the breaking zone, in which process the microcracks are generated in the interior of the glass wall or the pane of glass.

8 Claims, 1 Drawing Sheet

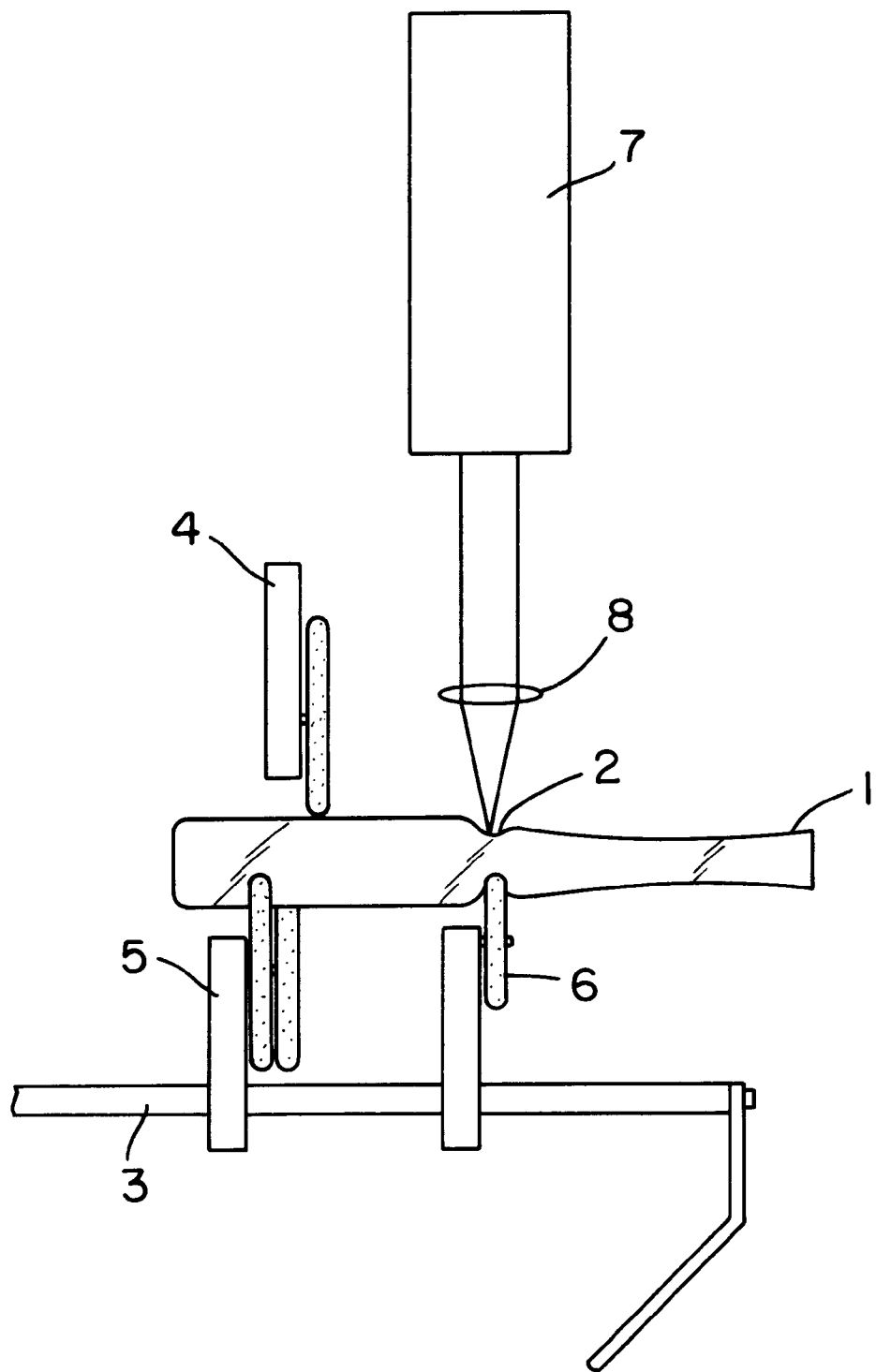

PROCESS FOR PRODUCING A DESIRED BREAKING POINT ON A GLASS BODY

Glass ampules are widely used for storing and transporting medicinal preparations. The reasons for this are firstly that they hermetically seal the contents of the ampules with respect to the outside world, and secondly they can be sealed quickly and easily by being fused together and can also be opened again relatively easily by breaking off the ampule tip which adjoins the ampule neck. A further advantage is the ease of optical inspection of the ampule contents through the transparent glass wall.

The opening of ampules (so-called break-open ampoules) has already formed the subject-matter of numerous patents and patent applications. However, the processes described therein are all subject to a greater or lesser extent to disadvantages. The broken edge, which is often jagged, on the ampoule, which has to be handled further after being broken open, causes a certain risk of injury, which is increased still further by the fact the breaking forces, which vary within a relatively wide range, may often reach rather high values, with the result that the hands, which at the moment are subject to a very high level of strain, can move in an uncontrollable manner after the ampoule breaks open, resulting in injuries on the jagged broken edge. Finally, there is also the problem that the breaking line penetrates into the main body of the ampoule, making it unusable. Moreover, broken glass which is formed during the breaking operation may contaminate the preparation situated in the ampoule.

The problems described above arise to an increased extent in conventional processes which mechanically generate a more or less defined incipient crack using a file, cutting wheel, diamond or the like as a desired breaking point on the surface of the ampule in the region of the ampule neck. The causes of this are, for example, fluctuations in the breaking forces as a result of tool wear and as a result of sensitivity of the processes to inevitable production-related fluctuations in the geometry of the ampoules.

One attempt which has been made to allow the breaking of ampules to proceed in a more controlled manner is the production of so-called breaking ring ampoules, in which the desired breaking line is marked with an enamel paint. The different coefficients of expansion of the ampule glass and the enamel paint mean that a network of microcracks is produced on the surface of the glass in the region of the marked ampule neck during subsequent heat treatment of the ampule, which network is used to initiate breaking. A drawback of this process is that there is still a risk, as previously, of broken glass being formed and of the preparation being contaminated with heavy metal particles from the paint when the ampule is broken open.

More recent processes use laser radiation as a contact-free tool which can be employed with very reproducible results and a high service life to generate incipient cracks. DE 35 37 434 A1 described such a crack formulation operation for break-open ampules. Pulsed lasers (CO, Nd:YAG) generate defined incipient crack holes at predetermined distances on the surface of the ampoule neck. According to this publication, this measure is said to ensure a controlled break (i.e. defined breaking forces and burr-free broken edges).

DE 43 00 730 C1 describes the use of a TEA-$CO_2$ high-power laser for the same purpose.

A process for generating a breaking stress as a desired breaking point by means of high-power electromagnetic irradiation with a high power density (Er: YAG laser) is described in DE 42 14 159.

In all the processes which have just been described, the glass is heated locally until it becomes a molten liquid by single pulses or multiple pulses in the region of the laser spot. The subsequent very rapid cooling of the molten zone generates tensile forces which are sufficiently high to produce the spontaneous (or forced: DE 43 00 730 C1) formation of microcracks. These microcracks represent the desired breaking point. In order for microcracks to be reliably generated, the tensile stress range has to exceed a minimum level, requiring a minimum volume of heated glass. This volume of glass has different physical and chemical properties from the starting material, which properties cannot be fully reversed even after a subsequent annealing (an extreme example is the appearance of so-called reboil blisters). The result can be increased risk of broken glass during breaking or an uncontrolled extent of breaking.

A further drawback of the laser processes described is that the incipient cracks, which lie on the surface or extend as far as the surface, are exposed to environmental effects, e.g., moisture, during the further handling of the ampules. It is thus possible for undesirable crack propagation to occur, leading to leakage or premature breakage of the ampoule. Moreover, the loading of the glass surface with glass particles or products of evaporation is undefined and is undesirable to the pharmacist.

For the reasons mentioned above, laser processes for generating desired breaking points in ampules have not yet become fully established.

SUMMARY OF THE INVENTION

The object of the invention is to form a desired breaking point in a break-open ampule in the region of the breaking zone in such a manner as to allow reproducible and safe opening of the break-open ampoule. In particular, it is intended to avoid injuries which can occur when opening ampules which are difficult to break open and to preclude impairment to the medicament caused by opening the ampoule.

According to the present invention, the desired breaking point is produced by the fact that microcracks are formed in a controlled manner in the interior of the glass wall of the ampule. In contrast to the prior art discussed at the outset, in which in each case the glass wall is weakened by microcracks from its surface, the surfaces in question remain undamaged when using the process according to the invention.

The generation of microcracks in the interior of a glass body has hitherto been disclosed only for the purpose of making these bodies. Thus, for example, DE 44 07 547 A1 describes a process for marking the interior of a body made of a transparent material by means of an Nd:YAG laser (one or more pulses), with a network of punctiform microcracks, which may be as small as 0.01 mm and are no longer visible to the naked eye, being formed within spatially limited regions. During the stress-relieving treatment, the residual stresses disappear, but the microcracks are permanent. EP 0 743 128 A1 describes a similar process in which the interior of transparent materials can be marked by means of a laser whose wavelength is not absorbed by the material.

A common feature of all these marking processes is that they are aimed at making the markings as visible as possible while simultaneously retaining the mechanical stability of the glass body. EP 0 743 128 A1 even emphasizes that it is a particular advantage of the process that the stability of the glass is not impaired by the markings which are made.

It has now surprisingly been found that the use of the process according to the invention not only allows the stability of a glass wall against breakage to be reduced considerably, but also that this reduction can be set in a controlled and reproducible manner.

The fact that the microcracks are situated in the interior of the glass wall means that there is no risk of the interaction with the environment mentioned at the beginning, which can lead to a change in the crack formation.

As a result, a hitherto unattainable stability of the breaking properties of the ampule when stored under widely differing conditions is achieved.

Furthermore, generating the microcracks beneath the surface of the glass is also advantageous because there is generally a prestressing in the glass which produces a compressive stress zone at the surface and a tensile stress zone, which is usually weak, in the interior of the glass. When the process according to the invention is employed, the tensile stress zone can, as described below, be utilized to produce defined crack formation, whereas in the cracking processes in accordance with the prior art, which act from the surface, it is necessary to penetrate through or compensate for the compressive stress zone near to the surface, so as to prevent the microcracks from healing out in the compressive stress region.

Advantageously, according to the invention the microcracks are generated by means of concentrated laser irradiation; in the case of ampules, as is known from the prior art, this takes place in the region of the ampule neck. It has proven advantageous here to focus the laser beam with a diameter of <100 μm onto the center of the glass wall. It is obvious that to do this it is necessary to use laser radiation with a wavelength at which the glass is transparent or at least semi-transparent. By suitably selecting the laser parameters, the person skilled in the art can regulate the formation and propagation of the microcracks, e.g., the length and geometric arrangement thereof, in a controlled manner. Finding suitable parameters to do this does not require any inventive step, and they can readily be determined by the person skilled in the art, for example by means of suitable routine experiments. As is clear from the above, it is also readily possible to adapt the process parameters to different geometries of the glass bodies (e.g., for ampules). The formation of the microcracks can take place using a single laser pulse or a series of laser pulses with a repetition frequency of approx. 10 to 100 Hz.

The crack formation may in addition be regulated further by a controlled local prestressing of the glass. It has been found that in the case of ampoules a prestressing which generates a tensile stress in the axial direction of the ampule in the region of the laser spot leads to the preferential formation of microcracks which are aligned in the circumferential direction of the tube. This crack geometry leads to a particularly good quality of break with minimum broken glass. The tensile stress may, for example, be generated in a manner known per se by means of burners (DE 36 15 287 C2), forming tools, additional laser beams or by applying mechanical bending moments during the laser treatment.

In order to guarantee the stability of an ampule even during relatively prolonged storage and transportation, the extent of the cracks perpendicular to the surface of the glass should not exceed approx. 0.5×wall thickness of the glass.

Two possible practical embodiments of the process according to the invention are described below with reference to the ampule example:

1) The desired breaking point may, for example, be generated at a point on the circumference of the constriction of the ampule by means of one or more microcrack zones arranged in the circumferential direction along the desired parting line. This process (one point cut) requires marking of the desired breaking point in order to align the ampule when it is broken open.

2) Furthermore, the desired breaking point may be generated along the desired parting line so as to run around the ampule neck (in a similar manner to a so-called breaking ring ampule). In this case, the ampule can be broken open without prior alignment. There is no need to mark the preferred direction of breaking. For a defined breaking process, the angular interval of the desired breaking points must not exceed 30 degrees. By comparison with the laser processes described in DE 42 14 159 C1 and DE 35 37 434 A1, the quality of break when the process according to the invention is used is improved considerably by the fact that the modulation of the breaking front by the desired breaking points, which are arranged along the breaking line, is considerably reduced. This is because the residual stress areas in the region of the laser spots in the processes described in DE 42 14 159 C1 and DE 35 37 434 A1 generally do not bring about the desired radial course of a crack front through the center of a laser spot, but rather cause the crack to deviate so that the crack front in each case runs around the centre of the spots on a semicircle segment. A crack course of this nature increases the risk of broken glass and injury.

The desired breaking point according to the invention may advantageously be applied during a section of the production process of the ampoules in which the ampoules are already secured in a defined manner for an operating step. This may, for example, be the previous station for applying the desired breaking point, a station for the optical inspection of the ampule or a chuck in the ampule turret. In particular, the desired breaking point according to the invention may be applied after the ampoules have cooled. In this case, there are no longer any residual stresses from previous operating steps.

Advantageously, the laser radiation source employed is Q-switched or mode-locked Nd solid-state lasers. A suitable optical system with a short focal length focuses the laser beam, which if necessary has a widened beam cross-section, to a spot diameter of <0.1 mm. With highly curved surfaces, it may be necessary to provide the beam with additional shaping, for example by means of a cylindrical or diffractive optical system (prior art). The use of non-Gaussian laser beam profiles makes it possible to achieve additional alignment of the microcracks in the breaking direction. Owing to the low laser pulse duration, if necessary it would also be possible to apply the desired breaking point during transportation of the ampule, but this requires increased outlay in order to keep the position of the focus in the wall constant to an accuracy of better than 0.1 mm. Process control may, for example, be carried out by opto-electronic observation of the plasma formation and readjustment of the laser parameters.

Naturally, the process according to the invention is not only suitable for applying desired breaking points to ampules. This process can also be used to generate high-quality, reproducible incipient cracks for numerous other applications, e.g. when cutting glass tubes.

The process may even be employed advantageously for special cutting processes in the field of flat glass (e.g. breaking glass pieces of any desired shape (watch glasses) out of a pane of glass).

An exemplary embodiment of the invention is illustrated in the drawing and described in more detail below.

BRIEF DESCRIPTION OF THE DRAWING

Various other features and attendant advantages of the present invention will be more fully appreciated as the same becomes better understood when considered in conjunction with the accompanying drawings, in which like reference characters designate the same or similar parts throughout the several views, and wherein:

FIG. 1 shows a diagrammatic layout of a station for generating a desired breaking point in a break-open ampule in accordance with the invention.

DETAILED DESCRIPTION

In FIG. 1, a desired breaking point is generated in a 2 ml ampule 1 made of borosilicate glass in the region of the ampule neck 2 (constriction).

The constriction was formed previously in the production process of the ampule on a turret machine with a forming tool to a diameter of about 6.5 mm and a wall thickness of about 0.8 mm. The desired breaking point is applied in the further processing line illustrated diagrammatically in FIG. 1, where the ampule 1 is lifted out of the chain conveyor and against a stop roller 4 using a lifting device 3. The ampule is mounted on the roller table 5, 6 in such a manner that the roller 6 tracks the forming tool.

A Q-switched Nd: YAG laser 7 with a pulse duration of approx. 10 ns and a pulse energy of 25 ml is used to generate the desired breaking point. The laser beam is focused onto the center of the glass wall using a laser lens 8 with a focal length of 50 mm: it has a diameter of about 0.1 mm. In order to ensure that the desired breaking point is generated in the center of the glass wall, the diameter of the constriction 2 may have a tolerance of at most 0.1 mm. With a laser repetition frequency of 10 Hz, desired breaking points are applied to the ampule neck 2 at a spacing of 1 mm along the circumferential direction. The rotation of the ampules which is required to achieve this is brought about by the drive of the roller 4.

The three desired breaking points are visible under a microscope and allow the ampule 1 to be broken cleanly and mechanically.

The entire disclosure of all applications, patents and publications, cited above and below, and of corresponding German application No. 197 28 766.2, filed Jul. 7, 1997, is hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A process for producing a selected breaking point for breaking a glass wall of a break-open ampule wherein the break-open ampule has a neck portion of a selected circumference, the process comprising: generating microcracks in the interior of the glass wall at the neck of the ampule in the circumference thereof by applying pulses of laser radiation having a wavelength to which the glass wall is at least semi-transparent.

2. A process according to claim 1, wherein the duration of each laser pulse is less than 1.0 ms.

3. A process according to claim 2, wherein the size of the microcracks is determined by irradiation with a series of laser pulses.

4. A process according to claim 2, wherein the size of the microcracks is determined by subsequent heat treatment.

5. A process according to claim 4, wherein the extent of the microcracks perpendicular to the surface does not exceed 0.5×thickness of the glass wall.

6. A process according to claim 1, wherein the size of the microcracks is determined by irradiation with a series of laser pulses.

7. A process according to claim 1, wherein the size of the microcracks is determined by subsequent heat treatment.

8. The process of claim 1 wherein the glass is borosilicate glass and the laser irradiation is generated from a q-switched Nd:YAG laser source.

* * * * *